May 14, 1963   W. C. KIRKPATRICK   3,089,283
SHRINKABLE FILM AS A STRUCTURAL AID
Filed Oct. 24, 1960

United States Patent Office 3,089,283
Patented May 14, 1963

3,089,283
SHRINKABLE FILM AS A STRUCTURAL AID
Wylie C. Kirkpatrick, Wayland, Mass., assignor to W. R. Grace & Co., Cambridge, Mass., a corporation of Connecticut
Filed Oct. 24, 1960, Ser. No. 64,416
3 Claims. (Cl. 50—80)

This invention is concerned with structural tension members and particularly with tension members which will exert tension upon the application of heat.

Although the member will be described in connection with a toy suitable as a premium novelty, it will be apparent that the member is useful in many architectural applications and may be used in place of members such as collar beams, metal rods or cables wherever its strength is adequate.

It is among the objects of this invention to produce a tension member which can be made to exert tension at will without the necessity of mechanical aids such as take-up nuts, or turn buckles. It is also among the objects to produce structural parts, such as a truss which is self-erecting upon the application of heat.

Figure 1:
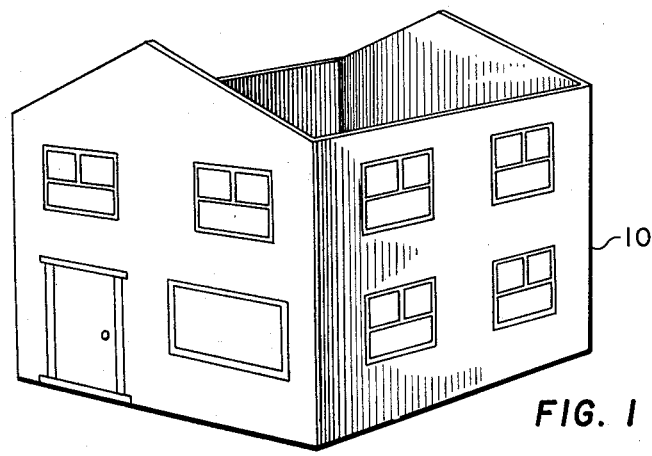
FIG. 1 represents a rectangular tube of carton board (the wall portion of a toy house).
Figure 2:
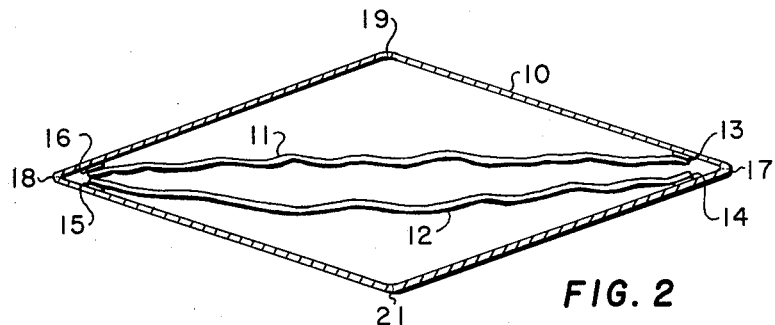
FIG. 2 is a cross-section through the tube showing the tube substantially flat-folded. (The drawing shows it slightly opened to show the tension members.)
Figure 3:
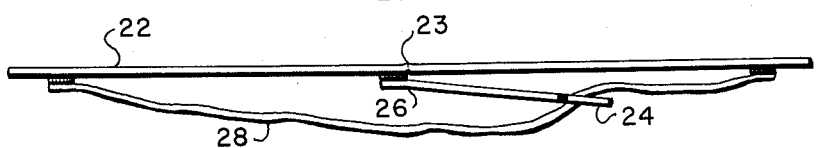
FIG. 3 is an end view of the flattened roof.
Figure 4:
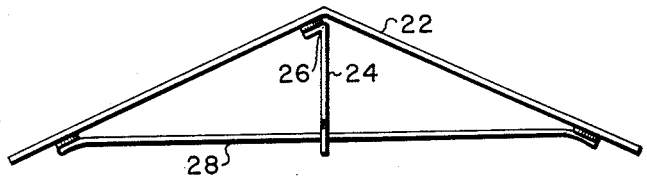
FIG. 4 is an end view of the roof when erected.
Figure 5:
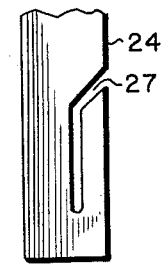
FIG. 5 shows, in elevation, the free end of the strut.

As FIG. 2 shows, the body of the house is a rectangular cardboard tube 10, creased at all corners. As received, the body is flat-folded. Two tension members 11 and 12 are attached at 13—14—15 and 16 to the interior wall of the tube 10, adjacent opposite corner folds—17 and 18.

Tension members 11 and 12 are made of heat-shrinkable material. Several materials are suitable for this purpose. As far as this invention is concerned, their chemical nature is of importance only insofar as it leads to proper physical characteristics and of these, high shrink energy and good tensile strength are of primary concern.

Among the polymers which are operative in my invention are irradiated, solid copolymers of ethylene and propylene (e.g., a 50–50 copolymer) or irradiated solid copolymers of ethylene with a minor amount, e.g. 5% of isobutylene, amylene, acetylene, butadiene, butene 1 and butene 2, or irradiated blends of low density polyethylene with from 25 to 90% by weight of a copolymer of ethylene and from 0.5 to 15% by weight of another olefin which has 3 to 18 carbon atoms, or block copolymers of polyethylene with a minor amount e.g., 5% of polyisobutylene, and irradiated graft polymers of polyethylene or polypropylene with monomers such as acetylene, butadiene, butylene, ethylene or polypropylene which materials are biaxially oriented.

But I prefer biaxially oriented irradiated polyethylene. When solid ethylene polymer is irradiated by a suitable high energy source and then is stretched longitudinally and laterally, it exhibits tensile strengths of from 5000 to 15,000 lbs. p.s.i. and shrink energies ranging from 100–500 lbs. p.s.i. at 96° C. For example—one polyethylene (alathon 14 of 20,000 average molecular weight, density 0.914 and melt index of 1.8 which has been irradiated to a total dosage of about 12 megarads and then biaxially stretched 350% in both directions will exhibit a shrink energy of 150 p.s.i. in both directions at 96° C. The higher shrink energy (500 lbs. p.s.i.) is exhibited when somewhat higher radiation doses have been given and/or stretching up to 700% longitudinally and up to 900% laterally has occurred.

By shrink energy, I mean the force of contraction at a given temperature when the material is restrained and more specifically it is the measurable tension in a fully monodirectionally restrained strip of film when heated to the specified temperature.

Returning to the toy, the tension members 11 and 12 need be only a strip of irradiated biaxially oriented film about .001 inch thick and (for a six inch square toy house) about one inch wide. The attachment of the strip at 13, 14, 15 and 16 is by any suitable means such as tying, staples, adhesive or more simply by being stuck under short strips of cellulose adhesive tape or running the film through a hole and expanding said film to fasten it. If desired, one member—11 or 12 may be omitted. The pull of one strip is sufficient to erect the tube.

When the flattened tube, as shown in FIG. 2 is exposed to a heat source such as a grill or a hot stove lid, the box rises and forms itself into a square tube. The pull of the tension members, which are shrunk by the heat causes the tube to hinge at the corner creases 19 and 20 and assume a rectangular shape.

The roof section is a flat sheet 22, creased at 23 to form a hinge. Optionally roof 22 carries a strut 24—which is also a strip of carton board adhesively fastened to the lower roof surface adjacent the center. Strut 24 is also creased at 26 and is positioned so that crease line 23 and 26 overlie. The lower end of strut 24 is slotted as at 27 to provide a passage for tension member 28. Member 28 is also a strip of film similar to films 11 and 12. It is stretched lengthwise across the flattened roof 22, passing through slot 27 of the strut 24 and is fastened near the inside cornice line in the manner described. The roof also will rise to its proper roof shape if it is exposed momentarily to a heat source such as a grill or a stove lid.

The amount of contraction of tension members described herein will depend upon how much it has been stretched and upon the degree of heating. Thus the amount of contraction is readily controlled by suitable choice of material used and/or by the time and/or temperature of heating.

In addition to toy novelties, window displays may be similarly equipped to allow their rapid erection and their being held in proper position merely by playing hot air on the tension members. Another use is setting up of assemblies where some or all of the parts are inaccessible.

It is also obvious that such tension members have architectural uses. The film may be twisted into strands and, if desired, the strands may be cabled to produce ropes capable of exerting powerful forces—when heat shrunk. Shrinking monofilaments and multifilaments may also be used. They could, for example, be used as the tension member of a truss and in place of collar beams, with considerable saving in space and in weight.

It is recommended that in shrinking the larger cross sections of such tension members a hot air gun be used. These are available in models which will deliver air heated to 300 to 700° F. Passing the gun along the tension member so that its air blast is directed at the surface will insure that the member will be almost completely shrunk.

I claim:
1. Self-erecting structural assembly comprising:
   (a) two pivotally connected compression members lying in a substantially flat plane; and
   (b) a tension member having a length approximating the sum of the lengths of the two compression members, one end of which is fixedly attached adjacent the free extremity of one of the compression mem- bers and the other end of which is fixedly attached adjacent the free extremity of the other compression member;

(c) said tension member consisting of a biaxially oriented polymeric substance having a shrink energy of from 100 to 500 pounds per square inch at 96° centigrade and a tensile strength of between 5,000 and 15,000 pounds per square inch, whereby said assembly is self erecting when said tension member is shrunk by heating the same to a temperature of about 96° centigrade.

2. Self-erecting roof portion of a toy house assembly comprising:

(a) a rectangular sheet having a centrally located crease hingedly connecting the panels on each side thereof; and (b) at least one tension member, extending transversely of said crease and having a length approximating the length of that side of said rectangular sheet which is transverse to said crease, the respective ends of each of said tension members being fixedly attached adjacent opposing extremities of said sheet;

(c) each of said tension members consisting of a biaxially oriented polymeric substance having a shrink energy of from 100 to 500 pounds per square inch at 96° centigrade and a tensile strength of between 5,000 and 15,000 pounds per square inch, whereby said toy house roof portion is self-erecting when said tension members are shrunk by heating the same to a temperature of about 96° centigrade.

3. Self-erecting wall portion for a toy house assembly comprising:

(a) a flattened rectangular tube of sheet material having two opposed gable walls and two opposed rectangular end walls; and (b) at least one tension member having a length approximating the sum of the lengths of one gable wall and one end wall, each of said members extending across the interior of said tube and being fixedly attached at its respective ends adjacent diagonally opposite corners of said flattened tube;

(c) each of said tension members consisting of a biaxially oriented polymeric substance having a shrink energy of from 100 to 500 pounds per square inch at 96° centigrade and a tensile strength between 5,000 and 15,000 pounds per square inch, whereby said toy house wall portion is self-erecting when said tension members are shrunk by heating the same to a temperature of about 96° centigrade.

References Cited in the file of this patent

UNITED STATES PATENTS

| | | |
|---|---|---|
| 888,774 | Wood | May 26, 1908 |
| 990,918 | Stadler | May 2, 1911 |
| 1,392,110 | Blascheck | Sept. 27, 1921 |
| 2,255,810 | Replogle | Sept. 16, 1941 |
| 2,377,335 | Finlayson et al. | June 5, 1945 |
| 2,613,937 | Kitson | Oct. 14, 1952 |
| 2,653,553 | Jacobs | Sept. 29, 1953 |
| 2,865,765 | Allen | Dec. 23, 1958 |
| 2,877,500 | Rainer et al. | Mar. 17, 1959 |
| 2,952,879 | Kitson et al. | Sept. 20, 1960 |
| 2,996,180 | Bruce | Aug. 15, 1961 |

FOREIGN PATENTS

| | | |
|---|---|---|
| 4,679 | Great Britain | of 1882 |